Figure 5:
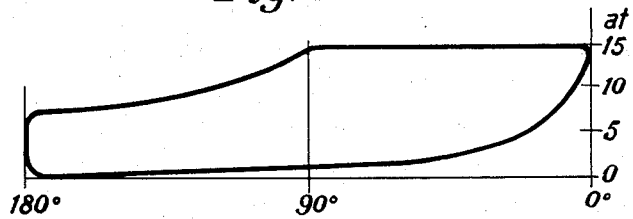

Aug. 6, 1935.  H. TRIEBNIGG  2,010,469
PROCESS AND MEANS FOR STARTING AND ACCELERATING DIESEL
LOCOMOTIVES WITH DIRECT DRIVE ON THE AXLES
Filed Feb. 16, 1932  5 Sheets-Sheet 1
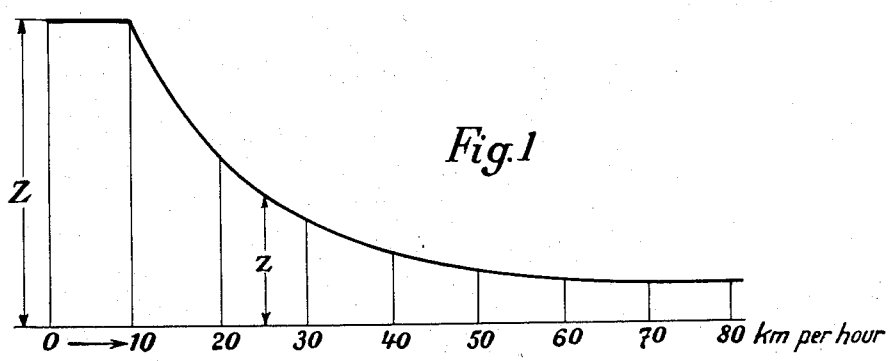
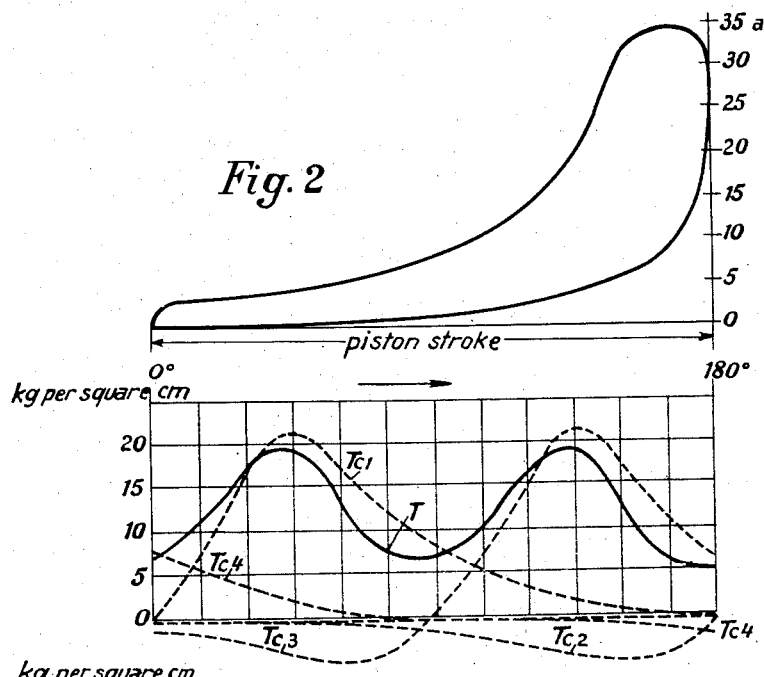
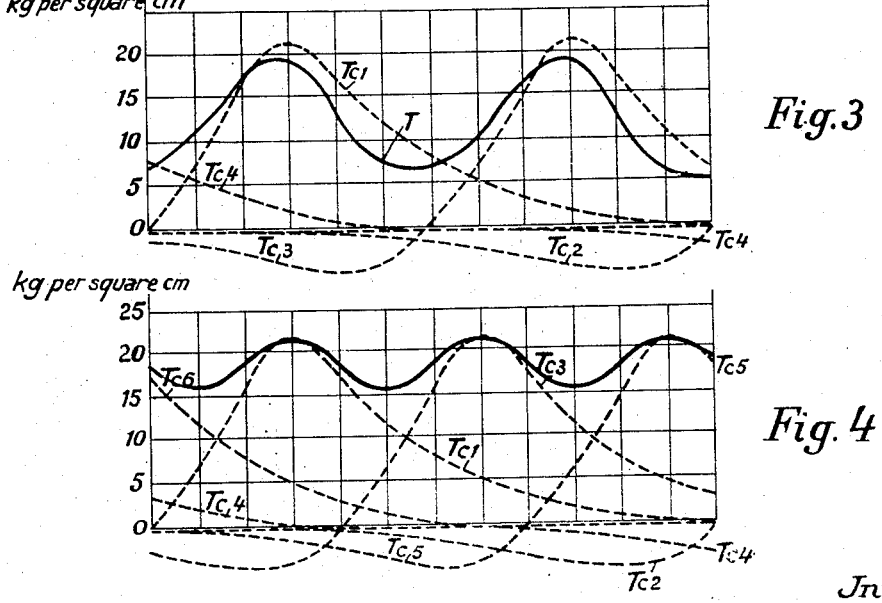
Inventor:

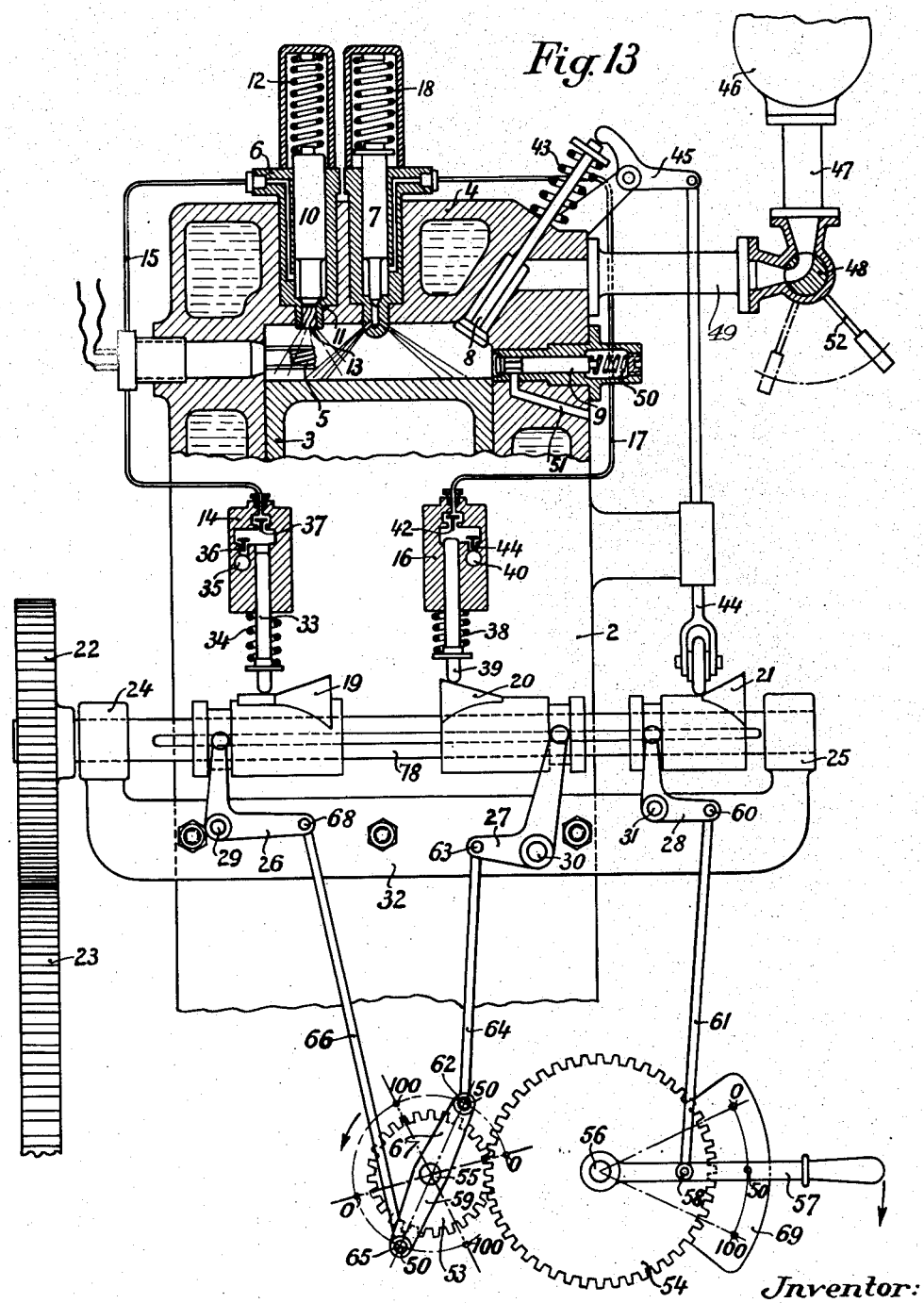

Patented Aug. 6, 1935

2,010,469

UNITED STATES PATENT OFFICE 2,010,469

PROCESS AND MEANS FOR STARTING AND ACCELERATING DIESEL - LOCOMOTIVES WITH DIRECT DRIVE ON THE AXLES

Heinrich Triebnigg, Cologne, Germany, assignor to Humboldt-Deutzmotoren A. G., Cologne-Deutz, Germany Application February 16, 1932, Serial No. 593,378
In Germany February 17, 1931

11 Claims. (Cl. 123—26)

This invention relates to locomotives driven by internal combustion engines, preferably Diesel-engines, and a method and device for starting and accelerating such locomotives.

The invention makes possible the starting of the driving engine from its state of rest without the use of transmission gears and without disengaging the driving connection to the axles. According to the invention, combustions of fuel and compressed air are executed beginning with the very first revolution, that is, the usual manner of starting the engine by introducing solely compressed air into the working cylinder is here abandoned. The advantage gained hereby is that the amount of compressed air carried with the engine need be only very small, since the pressure is raised in the engine cylinder by the combustion of fuel. Thus it is even possible to supply the compressed air by a relatively small auxiliary compressor. The compressed air and fuel without air are brought into the combustion chamber each through a separate valve for the major part of the working stroke of the piston. Ignition is effected by a glowing body, for example an electrically heated element.

In the operation of the engine during starting according to the invention, a low combustion pressure is used, as compared with the ordinary Diesel engine operation in which self ignition or compression ignition, in consequence of the high degree of compression takes place. The low combustion pressure may be secured, for example, by blowing out or releasing part of the air drawn in by the piston during the suction stroke, or by throttling the intake manifold. The pressure in this operation may even be reduced to atmospheric pressure in the case that a small tractive force is required. On the other hand, the compressed air and fuel are charged into the cylinder beginning about the inner dead center over a comparatively large part of the working stroke, as e. g. 50%. By these two measures, i. e. lowering the combustion pressure and extending the time of charging the combustion chamber during the working stroke, an indicator diagram is obtained which is similar to that of a steam engine. By reason of this indicator diagram, the engine may act on the axles of a locomotive simply by means of connecting rods and cranks as is usual in steam locomotives. No other gears are required.

Figure 6:
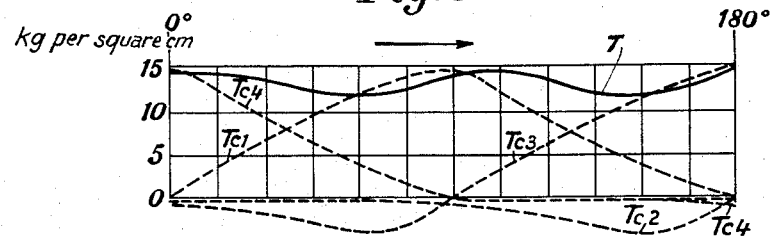
Figure 7:
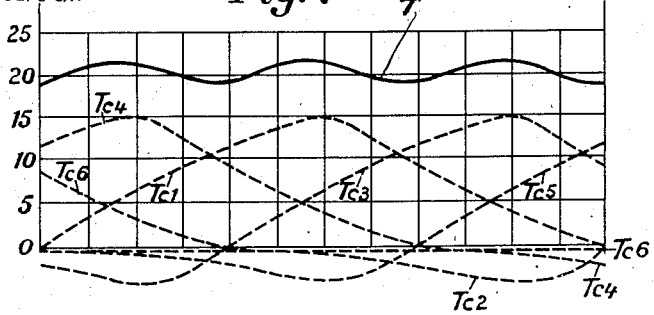
Figure 8:
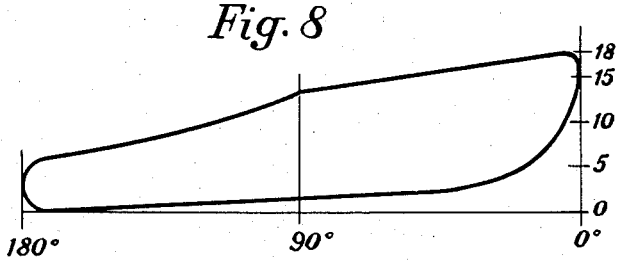
Figure 9:
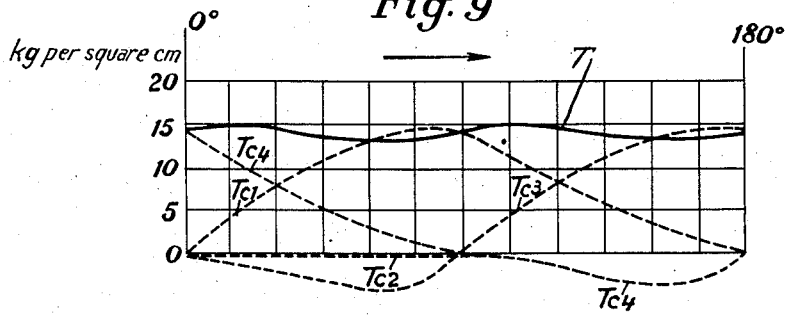
Figure 10:
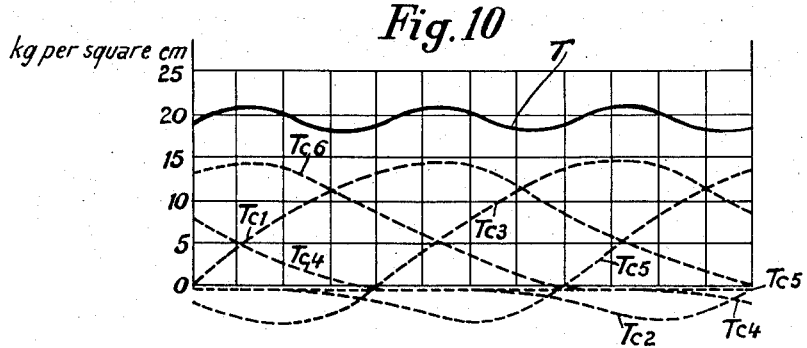
Figure 12:
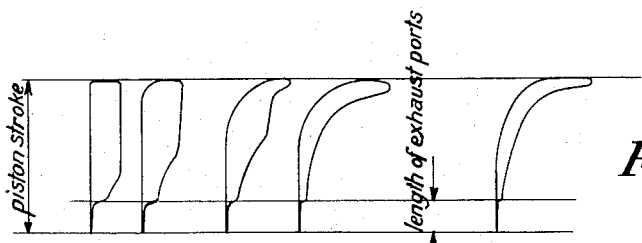
Figure 11:
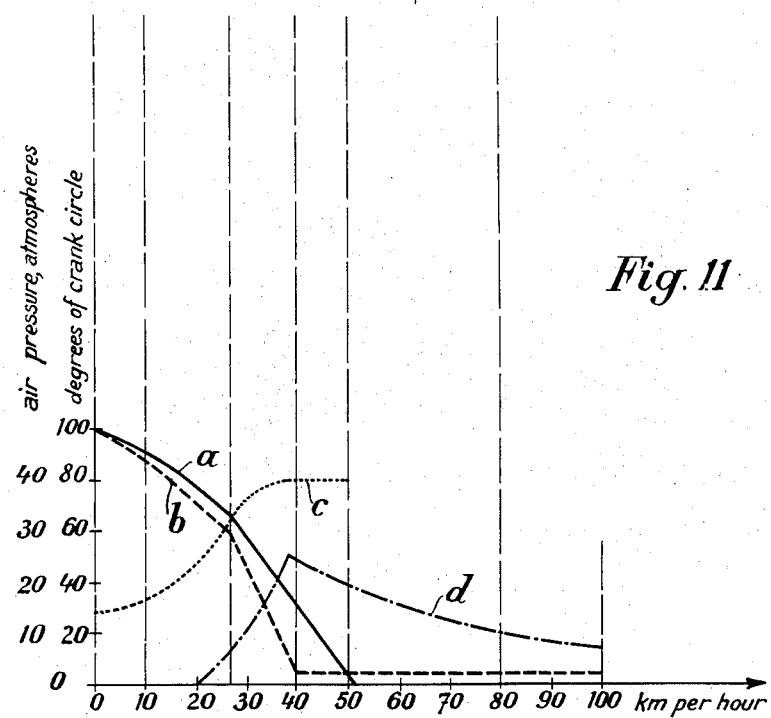

The different diagrams required for starting and accelerating a locomotive according to the prior art and as obtained by the process according to this invention will be described hereinafter in conjunction with the accompanying drawings wherein:

Fig. 1 is a diagram showing the relation between tractive effort and speed of a locomotive, Fig. 2 is an indicator diagram of a typical Diesel engine, Fig. 3 is a diagram of the tangential forces exerted upon a shaft by a double-acting two-cycle engine of two cylinders, Fig. 4 is a diagram of the tangential forces exerted upon a shaft by a double-acting two-cycle engine of three cylinders, Fig. 5 is an indicator diagram of a Diesel engine operated in accordance with the instant invention, Figs. 6 and 7 are diagrams of the tangential forces exerted upon a shaft by double-acting two-cycle engines of two and three cylinders, respectively, in accordance with the instant invention, Figs. 8, 9 and 10 show diagrams corresponding to Figs. 5, 6 and 7, respectively of a modified control of the internal combustion engines, Fig. 11 shows curves of the regulation of a Diesel engine according to the instant invention for different speeds attained by the locomotive, Fig. 12 represents the indicator diagrams of the engine at the corresponding speeds of the locomotive indicated on the axis of abscissas in Fig. 11, and Fig. 13 is an elevation partly in section of the regulating means for the engine.

Fig. 1 shows the tractive force in dependence on the travelling speed of the locomotive. The maximum tractive force Z as shown e. g. for speeds from 0 to 10 kms. per hour is limited by the frictional resistance between rails and driving wheels and by the weight resting on these wheels. A greater force will cause sliding of the driving wheels. At 10 km. per hour the maximum effect of the driving engine is reached. Since the engine cylinders and pistons should not be overstrained by heat, this maximum effect cannot be exceeded, or in other words the tractive force for increasing speeds must be decreased in inverse relation to the speed.

Fig. 2 is a known indicator diagram of a Diesel engine. The ignition pressure or the pressure at which ignition takes place of about 35 atmospheres depends generally on the compression ratio for self-ignition of the fuel.

The tangential forces exerted by the connecting rods on the crank shaft (axle) are illustrated in Figures 3 and 4 for a double acting two-cycle engine of two and three cylinders respectively, over half a revolution i. e. 180° of the crank pin.

The forces are measured in kg. per one square cm. of the piston area. The lines Tc1 to Tc4 in Figure 3 and lines Tc1 to Tc6 in Figure 4 represent the tangential forces due to the combustions in the individual cylinder chambers, and T represents the resulting entire tangential force in each case. Evidently the force T is much more uniform for the three cylinder engine than for the two-cylinder engine. But this uniformity is not sufficient for acceleration of the train. The greatest value of this force T will exceed the maximum tractive force Z as limited by the rail friction, i. e. the wheels will slide on the rails if the lowest value suffices for moving the train. Inversely the lowest value of the tractive force T will be insufficient if the highest value lies below the maximum allowable force Z determined by rail friction.

The Figures 5 to 7 show an indicator starting-diagram of the working process according to the invention and the corresponding diagrams of the tangential forces of a two cylinder and a three cylinder engine. The ignition pressure or the pressure at which ignition takes place is about 15 atmospheres against 35 atmospheres in the normal diagram of Fig. 2. Further the admission of compressed air and of fuel are extended to about one half of the stroke. The above ignition pressure remains nearly constant over this time. The loss of energy in the exhaust gases at about 7 atmospheres is endurable on account of the short time of acceleration. Comparing the tangential force of Figures 6 and 4 it is evident that with the new process even a two cylinder engine has a more uniform tangential force than a three cylinder engine using the old indicator diagram. The tangential force of a three cylinder engine with the new process according to Figure 7 is even more uniform.

It is not necessary that the ignition pressure or the pressure at which ignition takes place remain the same up to the closing of the fuel valve and of the compressed air valve. In the indicator diagram of Figure 8 this pressure drops from 18 to about 14 atmospheres before expansion begins. The corresponding tangential forces of Figures 9 and 10 for a two-cylinder and a three cylinder engine are even more uniform than in the previous case.

It must be considered that the invention lies in the combination of using both a low combustion pressure and a great part of the working stroke during which the cylinder is charged. Using only a long charging time without lowering the combustion pressure would result in too high exhaust pressures and temperatures of the cylinder. A low compression and ignition pressure with the usual time of combustion of about 10 to 20 per cent of the piston stroke would give a sufficient uniformity of the tangential force, but the mean pressure would be too low for the desired acceleration of the train. Of course the charging and combustion time need not always extend exactly over half the working stroke, it may be more or less depending largely on the number of cylinders, which for a locomotive usually is two or three. The influence of this number on the uniformity of the turning moment has been duly demonstrated.

The means for executing the described mode of operation such as the fuel valves for airless injection, the compressed air valve and the inlet and exhaust parts or valves, respectively, are of the usual kind. The driving means of the valves have to be dimensioned accordingly. Always necessary for the starting process is an ignition device as e. g. an electrically heated wire spiral of a heat resisting material as Nichrotherm or a ceramic substance as carborundum or silicon. The heating element must possess a high caloric capacity which renders it indifferent to the cooling effect of fuel or compressed air thrown against it. Finally the valve for diminishing the compression in the engine is new, as compared with the normal type. The engine will be described later in full details in relation to Figure 13.

The mode of operation and means according to this invention in the transition from starting the engine with combustion of fuel and compressed air to the normal Diesel process with compression ignition will now be described. Already during acceleration of the engine a gradual transition may take place to the normal working process as e. g. the so-called Diesel-process, in which self-ignition of the fuel occurs due to the high compression temperature. During the acceleration, the charge of compressed air is gradually decreased to zero by reduction of the charging time relative to the working stroke. Simultaneously the time of fuel injection is reduced which is generally proportional to the charge of fuel and which is much higher during starting than in normal working of the engine. The normal combustion pressure is also restored during the same time. In accordance to the increase of compression, the pressure of the charging air eventually must be raised to overcome the increasing pressure in the cylinder.

According to the invention, two different fuel valves or sets of valves and also two fuel pumps are applied, one of which operates during starting, and the other one during normal running of the engine. As shown in Fig. 13, the former discharges fuel into the chamber with a large dispersion of low force in the vicinity of a glowing ignition element and the latter in a spray of lesser dispersion of higher force. Each pump delivers fuel to one of the two different fuel valves in the cylinder head. One of these valves is dimensioned especially for starting requirements i. e. so that the fuel is dispersed at low force very finely without impinging on the cylinder walls. This valve is loaded e. g. to about 50 to 150 atmospheres. The nozzle holes accordingly are dimensioned small or another kind of resistance is set up in the valve. The foggy spray of fuel will ignite surely upon touching the glowing ignition body. The pump pressure for this nozzle is comparatively low, as on account of the proximity of the valve to the ignition body, the fuel particles need not traverse the whole combustion chamber. It would even be disadvantageous if the fuel would reach the relatively cool cylinder wall without igniting. The second fuel valve must be dimensioned for the purpose of injection in the normal Diesel process. The valve is loaded e. g. to about 300 atmospheres by a spring, against the tension of which the valve opens. The operating mechanism of the compressed air valve and of the fuel pumps are regulated together, so that for the first starting, only compressed air and the first fuel pump give the greatest charge. With growing speed, and in dependency thereof, both air and the first fuel pump are cut off gradually, and simultaneously the second pump begins to act through the other fuel valve. For a certain time during acceleration, the delivery of both pumps may overlap. A more detailed manner of regulation is diagrammatically illustrated in Fig. 11. The abscissas represent the traveling speed of the locomotive in kilometers per hour. The vertical distances (ordinates) from the base line to the curve $a$ are the degrees of angle of the crank circle in the working stroke counted from the inner dead center, during which compressed air is admitted to the cylinder. At 50 km. per hour the air is cut off altogether. The curve $b$, representing the angular duration of fuel injection through the first (starting) fuel valve, is very similar. At 40 kms. per hour, the fuel delivery of this valve is nearly interrupted. For higher velocities always a very small amount is discharged to avoid choking of the nozzles. The injection pressure $c$ of compressed air rises from nearly 15 atmospheres at the beginning of operation to about 40 atmospheres at 50 kms. per hour for the reason that the increasing combustion pressure in the cylinder must be overcome. The second fuel pump begins to work e. g. at 20 kms. per hour, as shown by the line $d$, and attains an angle of injection of about 50 degrees in the crank circle at almost 40 kms. per hour, where the actual Diesel-process begins, and from thereon the delivery drops continuously with respect to the decrease of the tractive force as stipulated by the demand of a constant output of the engine which was demonstrated in connection with the diagram of the tractional force Fig. 1.

In the Fig. 12 the different indicator diagrams taken during starting and acceleration of a two-cycle port-regulated engine are shown above the corresponding travelling speeds of the locomotive in Fig. 11. At the start, the cylinder is charged with compressed air and fuel over about 60 per cent of the working stroke. The compression by the piston is omitted altogether. The combustion pressure is accordingly low. In the diagram at 10 kms. per hour a little compression takes place, the combustion pressure rises and the time of charging is diminished to nearly half the stroke. The third diagram taken at 26 kms. per hour is further changed in the same direction and also the influence of the second fuel pump is seen by the pressure rise in the first part of the working stroke. The fourth is an ordinary Diesel-diagram showing yet a certain supercharge by compressed air.

The regulating mechanism and part of the engine adapted to execute the process described is illustrated in Fig. 13 of the drawings, in which 2 is the working cylinder, and 3 the piston in its upper dead center position. Through the cylinder head 4 reach an electrically heated ignition element 5, the fuel valve 6 for starting, the fuel valve 7 for the ordinary Diesel-process, the compressed-air starting valve 8 and the compression relief valve 9. The needle 10 of valve 6 is pressed on its seat 11 by spring 12, and it terminates in a spiral-grooved point 13 which secures a large dispersion of the fuel. The valve opens in the known manner by fuel pressure transmitted by the fuel pump 14 through the pipe line 15. The valve 7 is charged by the fuel pump 16 through the pipe 17. The spring 18 on the needle 7 is stronger than spring 12 of valve 6. Both fuel pumps and also the compressed air valve 8 are operated by sloped cams 19, 20, 21 slidably mounted on the common shaft 18 which is driven by gears 22 and 23 from the main crank shaft not shown. The shaft 18 is supported in bearings 24 and 25. There are three bell crank levers 26, 27 and 28 fulcrumed at 29, 30 and 31 in the bracket 32. The stroke of the plunger 33 of the fuel pump is varied with the lift of the cam 19. The cam is formed so that the plunger always starts to pump through the pressure valve 37 while the piston 3 of the engine is about its inner dead center, and finishes its delivering stroke at a later period in direct proportion to the height of the lift. The spring 34 effects the suction from the suction channel 35 through the valve 36. The pump 16 acts on the same principle. The plunger 39 is actuated by the cam 20 in the delivering stroke and by the spring 38 in the suction stroke. The suction channel is designated 40, the suction valve, 44, and the pressure valve, 42. The cam 20 is formed so as to pump only about the inner dead centre of the engine piston. By shifting the cam, mainly the amount of fuel is varied, but only slightly is the time of injection changed. The cam 21 opens the compressed air valve 8 against the tension of the spring 43 by means of the push rod 44 and the bell crank lever 45. This cam is of similar cross section to the cam 19, i. e. by engaging with the push rod 44, it opens the valve always about the inner dead centre and changes the time or duration of communication of the combustion chamber with the source of compressed air. The compressed air is admitted to the valve 8 from the vessel 46 through pipe 47, rotary valve 48 and pipe 49. This valve 48 serves to throttle the air pressure for the inital operation and to render free the full pressure during acceleration of the engine, in the manner as shown in the diagram of Fig. 11 by the curve $c$. The rotary valve is adjusted by the hand lever 52. The valve 9 is held open by the spring 50. The combustion space then communicates with the atmosphere by way of the hole 51. If the piston 3 moves upward slowly during the compression stroke, as in the very first movement during starting, the current of the outgoing air will not close the valve 9. But as the engine gains speed, the force of the air blown out through the valve 9 will close the valve against the tension of spring 50, and as the piston always starts its upward movement from the lower dear center with the velocity equal to zero, the closing of the valve occurs earlier in the piston stroke as the speed of the engine is higher. Thus the full compression is automatically reinstated in dependency of the engine speed. Of course instead of the automatic valve, another cam on the shaft could actuate the relief valve.

In the lower part of Fig. 13 are shown two gear wheels 53 and 54 meshing together. They are fulcrumed at 55 and 56. Fixed to the wheel 54 is the hand lever 57 and the pin 58. The latter is connected to the pin 60 of the bell crank lever 28 by the rod 61. The wheel 53 carries a two-armed lever 59, 67 fixed thereon. The pin 62 of the upper arm 67 is connected to the pin 63 of bell crank lever 27 by rod 64, and the pin 65 of the lower arm 59 is connected to the pin 68 of the bell crank lever 26 by rod 66. There are indicated in dot-and-dash lines three positions of the levers 57, 59 and 67, the corresponding positions each marked by the same numerals 0, 50 and 100. These numerals signify approximately the travelling speeds of the locomotive. If the lever 57, beginning at zero while starting is lowered slowly in harmony with the actual speed, and the speed as indicated on the dial 69, both fuel pumps 14, 16 and the compressed air valve 8 are actuated in a similar manner as required by the diagrams of Fig. 11. The regulating mechanism is shown in the position for 50 km. per hour travelling speed. The push rod 44 is just out of engagement with the cam 21. The fuel pump 14 delivers very little to prohibit choking of the valve 6, and the cam 20 actuates the pump 16 for nearly the highest amount of delivery. Lowering the lever 57 will only shorten the duration of the delivery of fuel by the pump 16 on account of the increased speed of operation of cam 20 at higher speeds of the engine. Naturally the regulating mechanism may also be set to any other position than to a conformity of the actual speed and that marked on the dial 69, which only indicates a favorable regulation for starting and accelerating under normal conditions. E. g. while driving up a slope after having gained full speed before, the lever 57 will be set back to compressed air fuel combustions to enhance the tractive force of the engine.

I claim:

1. The method of starting and accelerating a directly coupled oil injection vehicle engine which operates in normal running with a compression pressure sufficiently high for compression ignition; which comprises admitting compressed air into the combustion chamber during a considerable portion of the work stroke at a pressure below the normal compression pressure of the engine, injecting fuel into the combustion chamber during a considerable portion of the work stroke, and continuously igniting the resulting mixture of fuel and air by an igniting device.

2. A process as described in claim 1, wherein the introduction of air and fuel into the cylinder continues through at least 45° of the work stroke.

3. A process as described in claim 1, wherein the introduction of air and fuel into the cylinder continues through at least 90° of the work stroke.

4. A process as described in claim 1, wherein as the engine speed increases the quantity of compressed air admitted during each work stroke is reduced, and the period of fuel injection is reduced.

5. A process as described in claim 1, wherein as the engine speed increases the period of introduction of compressed air and fuel is reduced.

6. A process as described in claim 1, wherein as the engine speed increases the pressure of the compressed air is increased while the quantity thereof introduced during each work stroke is reduced, and the period of fuel injection is reduced.

7. The method of starting and accelerating a directly coupled oil injection vehicle engine which operates in normal running with a compression pressure sufficiently high for compression ignition; which comprises admitting compressed air into the combustion chamber during a considerable portion of the work stroke at a pressure below the normal compression pressure of the engine, injecting fuel into the combustion chamber during a considerable portion of the work stroke, and continuously igniting the resulting mixture of fuel and air by an igniting device, thereby maintaining in the combustion chamber a steady pressure between that required to start the engine and an upper limit corresponding to the tangential force which would skid the vehicle wheels.

8. The method of starting and accelerating a directly coupled oil injection vehicle engine which operates in normal running with a compression pressure sufficiently high for compression ignition; which comprises admitting compressed air into the combustion chamber during a considerable portion of the work stroke at a pressure below the normal compression pressure of the engine, injecting fuel into the combustion chamber in a spray of low force and great dispersion during a considerable portion of the work stroke, and continuously igniting the resulting mixture of fuel and air by an igniting device.

9. The method of starting and accelerating a directly coupled oil injection vehicle engine which operates in normal running with a compression pressure sufficiently high for compression ignition; which comprises reducing the compression below that normal for the engine on the stroke preceding the work stroke, admitting compressed air into the combustion chamber during a considerable portion of the work stroke at a pressure below the normal compression pressure of the engine, injecting fuel into the combustion chamber during a considerable portion of the work stroke, and continuously igniting the resulting mixture of fuel and air by an igniting device.

10. The method of starting and accelerating a directly coupled oil injection vehicle engine which operates in normal running with a compression pressure sufficiently high for compression ignition; which comprises reducing the compression pressure to nearly atmospheric pressure, admitting compressed air into the combustion chamber during a considerable portion of the work stroke at a pressure below the normal compression pressure of the engine, injecting fuel into the combustion chamber during a considerable portion of the work stroke, and continuously igniting the resulting mixture of fuel and air by an igniting device.

11. A process as described in claim 9, wherein as the engine speed increases the compression is gradually increased toward that normal for the engine, the pressure of the compressed air is correspondingly increased while the quantity thereof introduced during each work stroke is reduced, and the period of fuel injection is reduced.

HEINRICH TRIEBNIGG